Sept. 28, 1937.     B. C. ROBBINS     2,094,469
SCRIPT READING DEVICE
Filed Sept. 14, 1936     2 Sheets-Sheet 1

Inventor
BENJAMIN C. ROBBINS.
By Howard J. Whelan
Attorney

Sept. 28, 1937.  B. C. ROBBINS  2,094,469
SCRIPT READING DEVICE
Filed Sept. 14, 1936  2 Sheets-Sheet 2

Inventor
BENJAMIN C. ROBBINS.
By Howard J. Whelan.
Attorney

Patented Sept. 28, 1937

2,094,469

UNITED STATES PATENT OFFICE 2,094,469

SCRIPT READING DEVICE

Benjamin C. Robbins, Baltimore, Md.

Application September 14, 1936, Serial No. 100,757

2 Claims. (Cl. 40—53)

This invention refers to improvements in reading devices and more particularly to the class pertaining to script reading. Among its principle objects are:—

To provide a facile arrangement for the holding and handling of script; to lessen the chance for confusion in the loss of the script or its misplacement; to increase the readability of the script; to have the script presented to the reader in neat and convenient manner and enable the latter to have free use of his hands; to provide for adjustments in readability and rate of reading the script; to have control of the script as to the reading line location which is under scrutiny and the prevention of loss of "place". Other objects will become apparent as the invention is more fully set forth.

Devices for holding scripts and manuscripts are usually limited in their utility and do not eliminate all the embarrassing occasions which a reader in any public situation may have to meet. In this invention, the device is made in a simple form that can be made neat and attractive. It affords all the convenience that a "reader" in a public occasion may require, for instance, he can place his script in the device; adjust the lens to suit his eyes and the desirable amount of magnification that he may desire; set it running at a speed to suit his personal rate of reading, and control the position of the script as to any line he may want to stress. He can stop the machine, reverse its motion. All handled in a convenient and suitable manner. The fact that the device can be arranged in this manner makes it desirable for use as a new unit of furniture that can be adapted to the requirements of the present progressive requisites. Having the freedom of his hands, the reader is free from the restraint that tends to obstruct the proper presentation of the subject matter that is before him. At the same time the device is designed to carry a script continuously and of unlimited length.

In the drawings, which illustrate by way of example, this invention:—

Similar reference characters refer to similar parts throughout the drawings.

Figure 1:
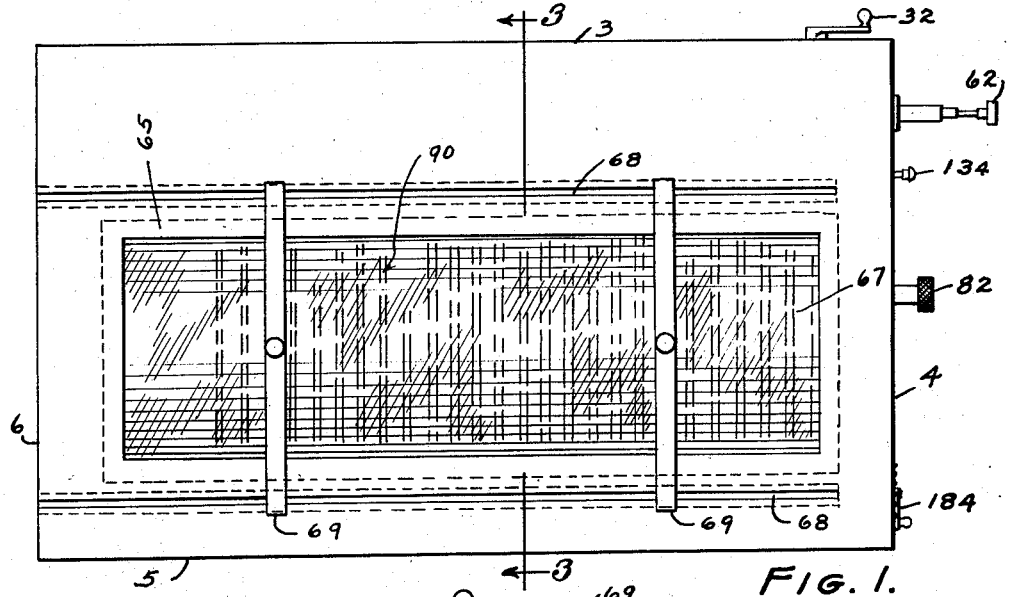
Figure 1 is a plan view of a script reading device embodying this invention.
Figure 2:
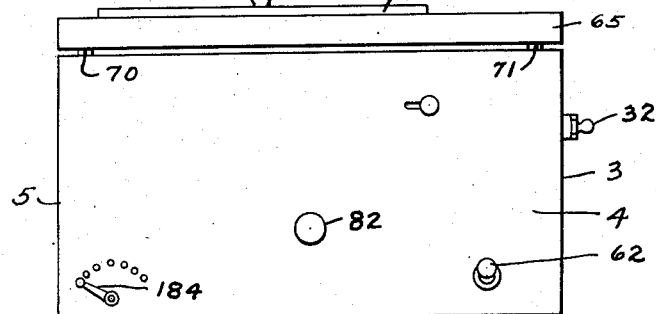
Figure 2 is a lower end view of the device and construction shown in Figure 1.
Figure 3:
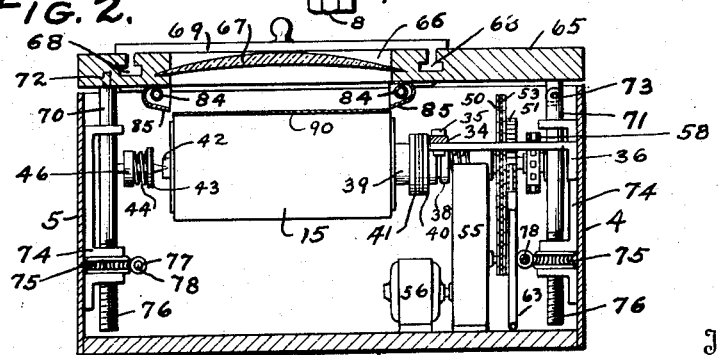
Figure 3 is a transverse sectional view along the line 3—3 of the construction shown in Figure 1.

In the construction of the device, 1 represents a cabinet containing the mechanism and supporting the parts thereof. It has a back 2 and four sides 3, 4, 5, and 6 respectively surrounding the latter and at right angles to the plane of the back. A bracket 7 is suitably and securely attached to the back and has an arm 8 adjustable by means of the slot 9 and wing nut screw 10 for positioning the same and the cabinet in a large range of positions from horizontal to vertical. The arm is provided with a clamp 11 with wingnut screw 12 for holding same on a pipe stand 13 which also gives a slight vertical adjustment. The mechanism in the cabinet consists of a pair of paper rolls 14 and 15 having slits 24 and 25 respectively for taking the beginning of the scripts to be attached thereto.

The paper roll 14 is a loose roll, having extension pieces 16 and 17 on opposite ends of the center line through the roll. The extension piece 16 is center countersunk to take the point 18 of steel pin 19. The pin 19 has a plate 20 secured to it and against which the spring coil 21 presses and keeps it towards the roll for frictional engagement therewith. The pin 19 is supported on a bracket 22 that is secured to the side of the cabinet. The other extension piece 17 is provided with a frictional clutch face 23 and a shaft stub end 26. The stub extends sufficiently to enter loosely into a passage in another corresponding clutch face 27. The last mentioned clutch face is secured to a shaft 28 journaled at 29, with a grooved hub 30, arranged to take a clutch fork 33, and also a sprocket 31 and outside-placed handle 32. The clutch fork 33 is mounted on a lever arm 34, pivoted at 35 on a support 36 and with its other lever arm 37 extending over to a clutch mechanism 38 that is connected with the extension piece 39 and faces 40, 41 of the pulling roll 15. This roll also has an extension piece 42, a plate 43, coil spring 44, pin 45 and supporting brackets 46 like the other mentioned roll 14. The lever arm 37 also has a clutch fork for operating the clutch mechanism 38. The latter is supported on a shaft 47 which has supports 48 to journal it, a coil spring 49, a sprocket wheel 50 and ratchet wheel 51 and another sprocket 52. A chain 53 mounted on the sprocket 50 and on another sprocket wheel 54 which is operated through a speed changer 55, receives power from a motor 56 connected to it. The electrical circuits connected to the motor and rheostat are not shown as it is assumed such can be readily understood without marking the drawings for them. A tension spring 57 keeps the lever arm 34 in tension as indicated.

A chain 58 connects the sprockets 52 and 31 together, and serves to transmit power from one to the other, for hand operation, or for rewinding the script on the roll 14.

A spindle wire 59 attached to one of the pawls 60 and springs 61, and a pushbutton 62 in the side wall 4, all serve to operate the ratchet wheel 51. The wire 59 passes through a flexible tubing 63, the latter being supported on an arm bracket 64. This ratchet mechanism is for operating the rolls one-line-at-a-time manually, where such operation is desirable.

The cover 65 of the cabinet is arranged with a window frame 66 in which a magnifier lens 67 is set securely. T-grooves 68 are cut in the cover to allow for the adjustable movement of sliders 69.

Figure 4:
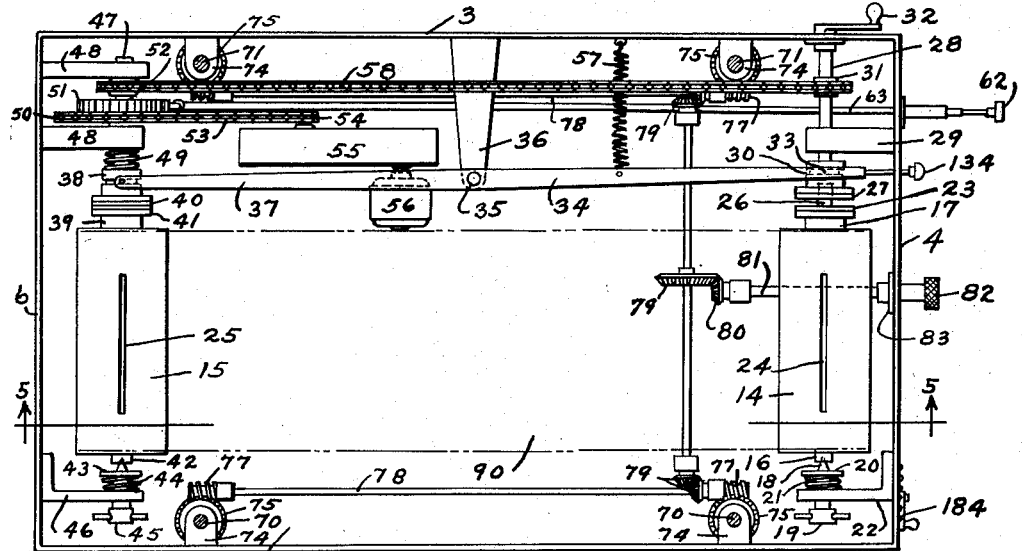
Figure 4 is a plan view with the cover removed from the device.
Figure 5:
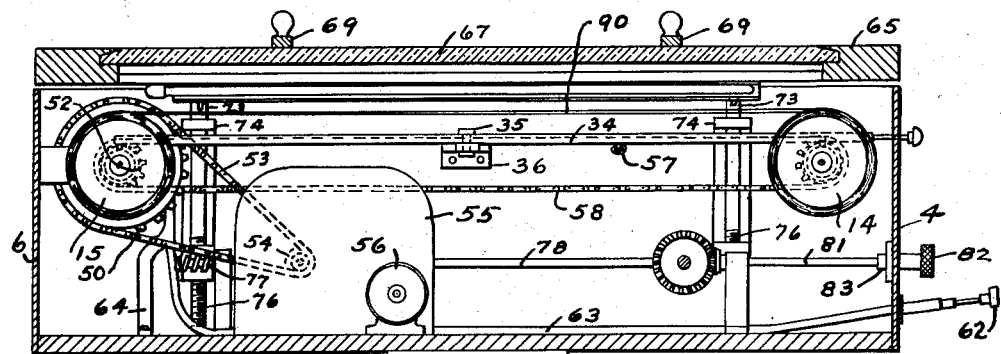
Figure 5 is a longitudinal view along the line 5—5 of the construction indicated in Figure 4.
Figure 6:
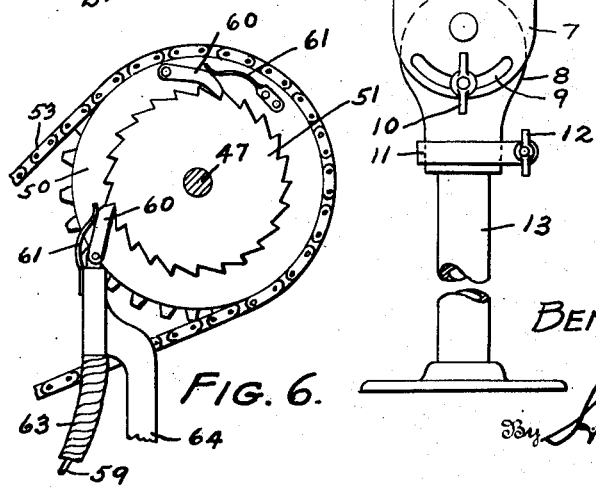
Figure 6 is a detailed view of the manually operated line-at-a-time feature of the device.

The cover 65 is supported on lifting posts 70, 71 at their upper portions and is operated by them. The posts 70 and 71 are so arranged that the cover may be raised off them with a little effort. They are locked together by a type of catch 72. The remaining posts 71 are preferably hinged at 73 to the cover. This permits the cover to be raised for access to the interior of the cabinet. The posts are in general similar, they are held by supports 74 attached to the side walls of the cabinet. Gears 75 of the worm type are mounted on them and through the use of bolt threads 76 on the posts and within the interior of the gears, serve to raise and lower the posts and with them the cover when the worm pinions 77 rotate. The pinions 77 are mounted on shafts 78 which in turn have suitable meshing gears 79 to operate the shaft, and as indicated in the Figure 4 of the drawings. A main bevel gear 80 engaging with this system of gears is attached to a main shaft 81 having a manual operating button 82, a suitable support 83, being provided for holding the parts in position. A suitable starting switch or rheostat 184 is mounted on the wall of the cabinet to conveniently arrange for the control of the motor 56. There is also an electrical circuit, not shown, but understood to be provided for a series of lamps 84 and reflectors 85 used to illuminate the script passing along between the rolls, and enables the writing to be easily read.

In the operation and use of the device, the cabinet is adjusted to the proper height and angle on the stand 13 to suit the particular reader about to use it. The script 90 is preferably typewritten ahead on a continuous roll which is that marked 14 in the drawings. It is drawn out until the end portion of the sheet can be inserted in the slit 26 and wound on the roll 15 until the latter gets its start. The clutch faces are contacted and the motor 56 put into operation. The roll 15 is then rotated through the links in the transmission, such as speed changer 55, chain 53 and the shaft 47, and the paper is wound up on the roll 15 from the roll 14 carrying the writing on the script in front of the magnifying window 65 and illuminated by the lights 84, so the reader can properly read same. The control 184 of the motor enables the user to adjust the speed of the motor to suit his requirements. Should the script happen to run-by and the operator desire to set the script back, he simply operates the button 134 on the lever arm 34 and through the arm and its fork causes the clutch 38 to throw the roll 15 out of rotation, and the roll 14 into rotation, which causes the script to run backwards or in reverse. This, in turn, may be changed to suit the rotation desired by the user. To adjust the window so that it will meet the eye focus of the operator, the button 82 is turned to raise or lower the lens 67, which is a converging concavo-convex type, to suit. If he wants to change the rolls or insert a loose manuscript page on the sheet of script, he raises the cover on its hinges, lays the loose manuscript on the basic sheet beneath and sticks same on quickly and removably with Scotch tape, or the like, closes the cover and continues as before. If the occasion arises where the rolls cannot be operated suitably at the time, by the motor or manually through the use of the handle 32, then the operator can operate the ratchet device with its wheel 51, pawls 60 and springs 61 through the use of the button 62 to suit himself.

All these different mechanisms enable him to get the results mentioned in the previous portions of these specifications and permits the reader to get any normal adjustment to meet his needs.

While but one form of the invention is shown in the drawings, it is not desired to limit this application for patent to the particular construction shown in the drawings otherwise than required by the prior art, as it is known that other constructions and designs may be developed that would employ the same principles and come within the scope of the appended claims.

Having thus described the invention, what is claimed is:

1. A reading manuscript holder comprising in combination, a cabinet having walls, bottom and cover, a window in the cover, lifting posts for supporting and adjustably positioning the cover, said posts being mounted on the walls of the cabinet, a plurality of rollers in the cabinet for holding manuscript and carrying same in registry with the said window, supports for the rollers attached to the cabinet, clutch plates on the rollers, clutch mechanism mounted in the cabinet for contacting and operating said clutch plates, a motor for operating the rollers through the clutch mechanism, and a one-line-at-a-time device for controlling the movement of the clutch mechanism independently of the motor, and worm and pinion mechanism for actuating the lifting posts synchronously, said last mentioned mechanism being united in a single operative unit and mounted within the cabinet with means for exteriorly operating said mechanism.

2. A reading manuscript holder comprising in combination, a cabinet having walls and a cover, a magnifying window in the cover, an adjustable support for the cabinet, lifting posts for supporting the cover adjustably at the corners thereof, an adjustable screw mechanism supporting the posts mounted in the cabinet, worm and pinion mechanism interconnected in one unit for operating the said screw mechanism in unison at each post, roller carriers for holding and carrying continuous manuscript thereon enclosed within the cabinet and under the magnifying glass, resilient means for supporting the carriers mounted in the cabinet, a motor for operating the carriers, clutch mechanism for connecting and disconnecting the motor to the carriers disposed in the cabinet and attached thereto, resilient means for the said clutch mechanism, and exteriorly extending means for actuating the clutch means and worm and pinion mechanism.

BENJAMIN C. ROBBINS.